United States Patent [19]
Moss

[11] Patent Number: 5,527,104
[45] Date of Patent: Jun. 18, 1996

[54] COMPUTER CHASSIS COVER ALIGNMENT APPARATUS

[75] Inventor: David Moss, Austin, Tex.

[73] Assignee: Dell USA, L. P., Austin, Tex.

[21] Appl. No.: 223,808

[22] Filed: Apr. 6, 1994

[51] Int. Cl.$^6$ .................................................. A47B 47/00
[52] U.S. Cl. ...................... 312/264; 312/257.1; 312/263; 312/223.2; 361/685; 463/13; 463/14; 463/375
[58] Field of Search ..................... 312/264, 223.1, 312/223.2, 257.1, 265.6, 265.5; 361/685; 403/13, 14, 326, 375

[56] References Cited

U.S. PATENT DOCUMENTS

| | | | |
|---|---|---|---|
| 2,058,148 | 10/1936 | Hard | 403/375 X |
| 3,548,425 | 12/1970 | Goldstein | 312/263 X |
| 3,832,075 | 8/1974 | Arai | 403/14 X |
| 4,166,708 | 9/1979 | Lafferly, Sr. | 403/14 X |
| 4,228,743 | 10/1980 | Crook | 312/264 X |
| 5,025,709 | 4/1991 | Miyazaki | 403/13 X |
| 5,169,218 | 12/1992 | Chu | 312/223.2 |
| 5,277,615 | 1/1994 | Hastings et al. | 361/685 X |
| 5,378,057 | 1/1995 | Bach et al. | 312/257.1 |
| 5,397,176 | 3/1995 | Allen et al. | 312/223.2 |

*Primary Examiner*—Jose V. Chen
*Assistant Examiner*—Rodney B. White
*Attorney, Agent, or Firm*—Henry N. Garrana; Mark P. Kahler; Michelle M. Turner

[57] ABSTRACT

A computer cover structure is removably slid over an associated computer chassis to place facing end walls of the cover and chassis in a contiguous, parallel relationship, the end walls are automatically aligned with one another, in two perpendicular directions parallel to their facing side surfaces, by a plurality of outwardly projecting lance strips associated with the cover structure end wall and received by corresponding elongated, generally diamond-shaped openings formed in the chassis end wall. The wall openings are longer and wider than the outwardly projecting longitudinally intermediate portions of the lance strips, and have oppositely sloped facing side edges. Initially, the longitudinally intermediate lance strip portions freely enter their associated chassis wall openings. As the lance strips pass through the openings, though, the openings close in on and engage the opposite ends of the received lance strip in a manner shifting the cover end wall as necessary relative to the chassis end wall, in two perpendicular directions, to achieve the desired precise alignment between the cover and chassis end walls.

11 Claims, 3 Drawing Sheets

COMPUTER CHASSIS COVER ALIGNMENT APPARATUS

BACKGROUND OF THE INVENTION

The present invention generally relates to computer apparatus, and more particularly relates to apparatus for creating and maintaining a desired alignment between portions of a computer chassis and an associated computer cover structure disposed over the chassis portions.

To provide for ready access to electronic components within its interior, a computer housing is typically formed from an open sheet metal chassis portion and a cover structure that slides rearwardly onto and closes the chassis portion. The installed cover structure is removably secured to the chassis portion by fastening members extending through openings disposed in facing rear portions of the chassis and cover, with a front end wall of the cover being in alignment with a front end portion of the chassis. In order to maintain the requisite relationship between the front end portions of the cover and chassis structures, some type of alignment structure is required at the front end of the chassis/cover interface.

In conventional computer housing design, this alignment structure typically comprises tab portions of the chassis which are bent forwardly, at ninety degrees, from the balance of the chassis and enter corresponding alignment slots in the front end wall of the cover structure. These bent flanges generally have rounded or chamfered edges to facilitate their entry into their associated cover structure alignment slots.

Two primary problems are typically associated with these bent flange and slot alignment structures. First, the flanges can be easily bent (during handling of the chassis) to the point that they no longer mate with their associated cover slots when the cover is subsequently attached to the chassis. Second, particularly in computer tower structures, the front cover wall provides a convenient lifting point for transporting the computer. Accordingly, the lifting force tends to be transferred, via the cover slot edges, to the chassis flanges in a manner tending to undesirably deform them away from their intended alignment orientations.

As can readily be seen from the foregoing, it would be desirable to provide improved computer chassis/cover alignment apparatus that eliminates or at least substantially reduces the above-mentioned problems typically associated with conventional alignment apparatus of the type generally described above. It is accordingly an object of the present invention to provide such improved alignment apparatus.

SUMMARY OF THE INVENTION

In carrying out principles of the present invention, in accordance with a preferred embodiment thereof, a computer, representatively in a tower configuration, is provided and includes a chassis, illustratively of a sheet metal construction, having a generally planar first wall portion, and a cover structure, illustratively of a sheet metal construction, having a second generally planar wall portion. The cover structure is slidable onto the chassis, toward an installed orientation of the cover structure, in a manner moving the second wall portion, along an axis perpendicular thereto, into a closely adjacent, facing, parallel relationship with the first wall portion.

Cooperatively interengageable means are provided on the first and second wall portions for creating and maintaining a predetermined, precisely aligned relationship between the first and second wall portions in response to movement of the cover structure to its installed orientation on the chassis. The cooperatively interengageable means include a spaced plurality of openings formed in one of the first and second wall portions, representatively the first wall portion, and a spaced plurality of laterally outwardly projecting lance strips formed on the other wall portion. The lance strips are representatively longitudinally curved along their lengths and are configured to enter and be closely and removably received in the wall openings in response to movement of the cover structure to its installed orientation on the chassis.

In a preferred embodiment thereof, each of the wall openings has an elongated, generally diamond shaped configuration, a length greater than the length of the lance strip removably receivable therein, a width at a longitudinally intermediate portion of the opening greater than the width of the lance strip removably receivable therein, and widths at opposite end portions of the opening less than the width of the lance strip removably receivable therein.

As the second wall portion initially approaches the first wall portion longitudinally intermediate portions of the lance strips freely enter their associated wall openings. Next, as the longitudinally intermediate lance strip portions move further through their associated wall openings, the openings close in on the lance strips in a manner such that the lance strip end portions are engaged by opposite side portions of the wall openings, thus shifting the cover structure as necessary, perpendicularly to the first and second wall portions, to automatically bring the first and second wall portions into a predetermined, precisely aligned relationship with one another.

DETAILED DESCRIPTION

Figure 1:
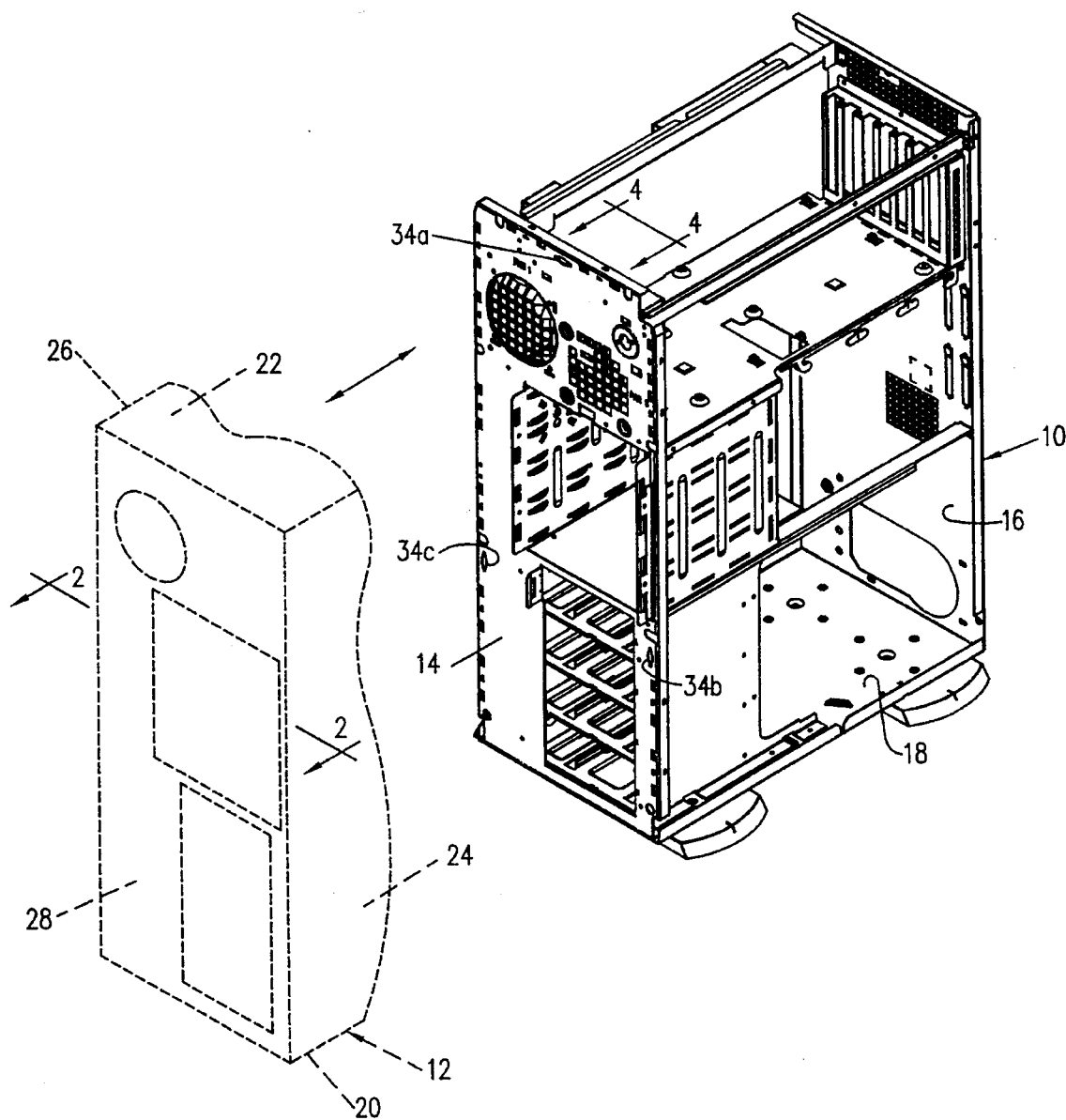
FIG. 1 is a partially phantomed exploded perspective view of a computer chassis and an associated computer cover incorporating therein a specially designed lance-based chassis/cover alignment apparatus embodying principles of the present invention.

Perspectively illustrated in FIG. 1 is a computer chassis 10 which is of an open, sheet metal construction and has a generally rectangular configuration, and an associated cover structure 12, a front end portion of which is shown in phantom, which may be horizontally slid rightwardly onto the chassis 10 to enclose it. The chassis 10 is representatively of the type used in a computer tower unit, and has a vertically extending front end wall 14, a vertically extending rear end wall 16, an open top side, and a bottom wall 18.

Figure 2:
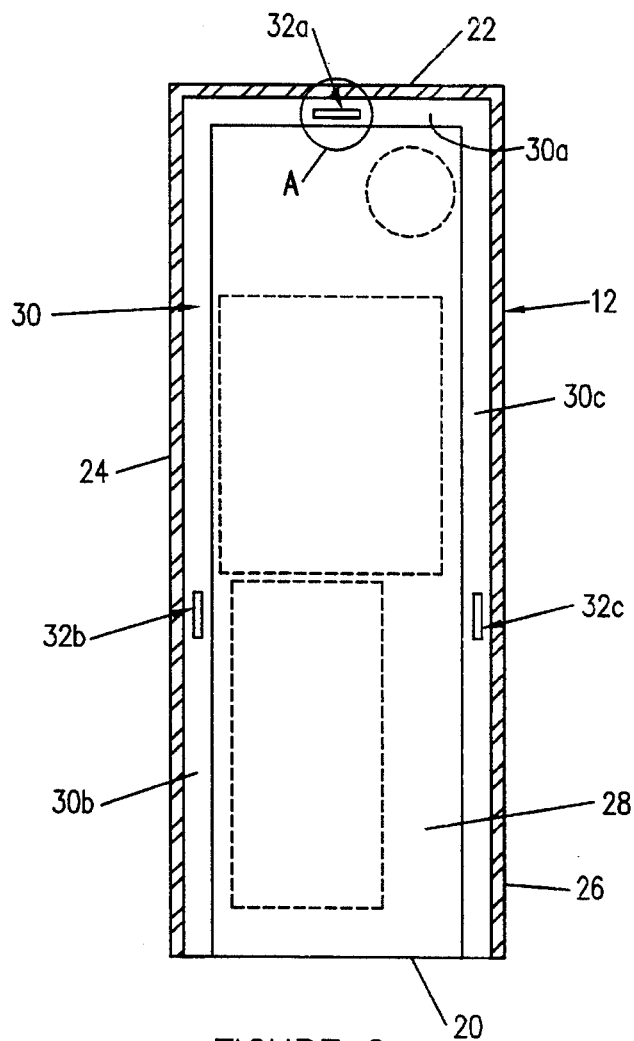
FIG. 2 is a simplified cross-sectional view taken through the computer cover along line 2—2 of FIG. 1.

Referring now to FIGS. 1 and 2, the cover structure 12 is representatively of a sheet metal construction and has a generally rectangular configuration with an open back side permitting the cover to be rearwardly slid over the chassis 10, an open bottom side 20, a top wall 22, a pair of vertically extending opposite side walls 24 and 26, and a front end or bezel wall 28. When the cover structure 12 is operatively slid rearwardly onto the chassis 10, the front end wall 28 of the cover structure 12 is positioned outwardly over the front end wall 14 of the chassis, and a rear end portion of the cover structure 12 (not shown) is removably secured to a rear end portion of the chassis using suitable threaded fasteners extended through suitable facing openings in the cover and chassis structures. For purposes later described, the cover structure 12 is provided, along the interior side of its front end wall 28, with an inverted U-shaped alignment frame structure 30 (see FIG. 2) having a top end portion 30a from the opposite ends of which a pair of opposite side portions 30b, 30c of the frame structure 30 depend.

In order to maintain a predetermined aligned relationship between the front chassis and cover walls 14, 28 when the cover structure 12 is installed on the chassis 10, and to transfer cover lifting loads to the chassis 10, the present invention provides alignment apparatus that includes a plurality of lance strips 32a, 32b, 32c respectively formed on and projecting rearwardly from the alignment frame portions 30a, 30b, 30c (see FIG. 2), and a plurality of specially configured openings 34a, 34b, 34c formed in the front chassis end wall 14 (see FIG. 1) and positioned to respectively receive the lance strips 32a, 32b, 32c when the cover structure 12 is operatively installed on the chassis 10.

Figure 3:
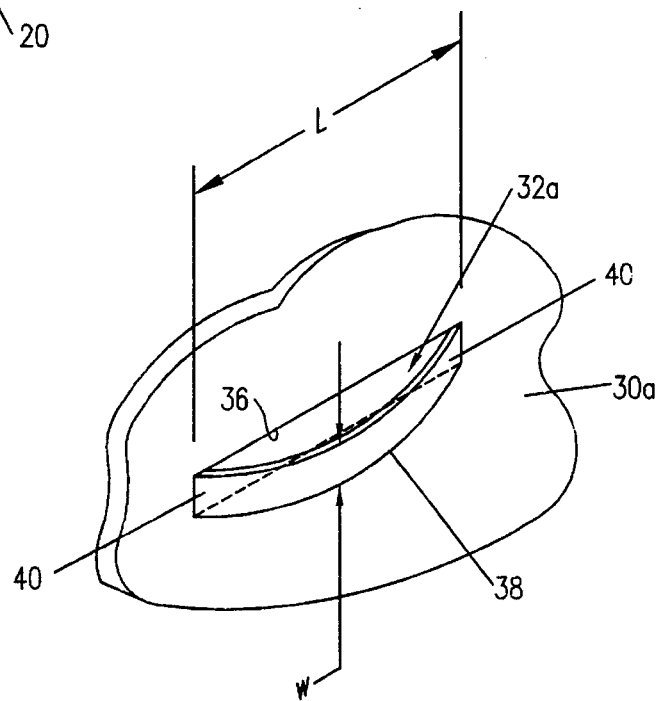
FIG. 3 is an enlarged perspective detail view of the circled area "A" in FIG. 2 and illustrates an alignment lance portion of the computer cover.
Figure 4:
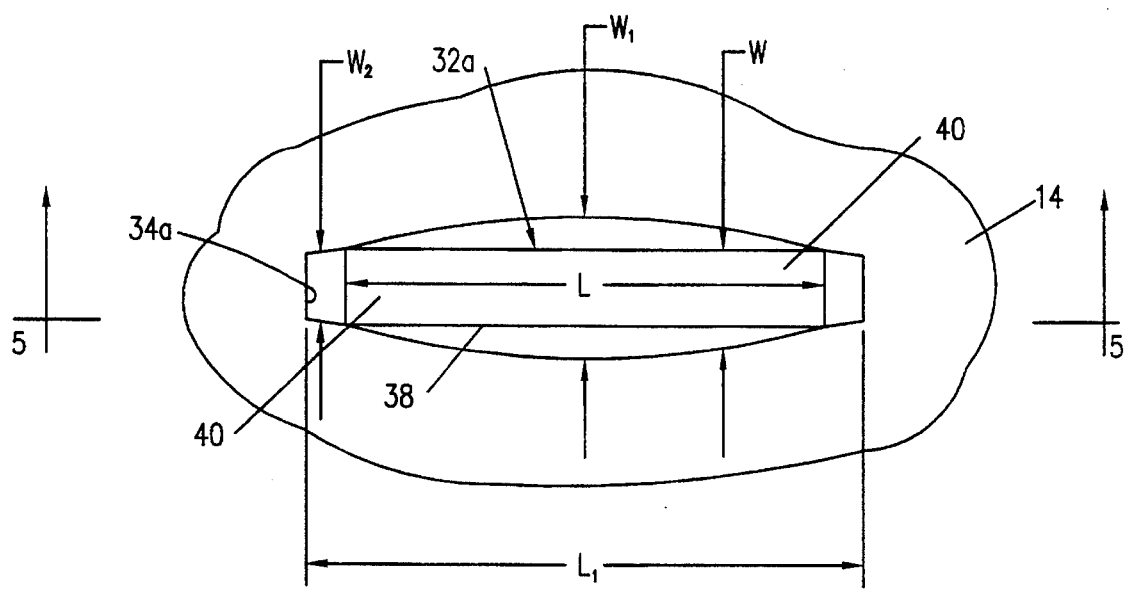
FIG. 4 is an enlarged scale interior side elevational view of a top portion of the front wall of the chassis, with the computer cover installed on the chassis, taken along line 4—4 of FIG. 1.
Figure 5:
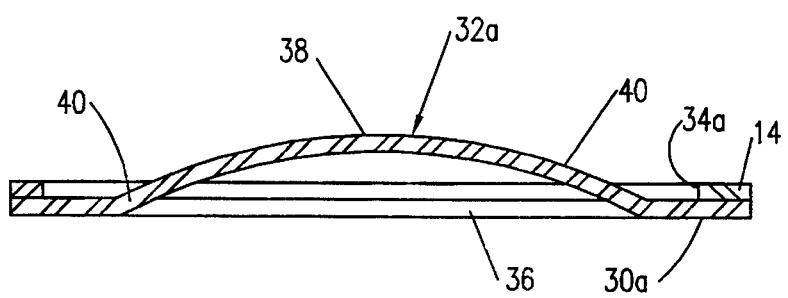
FIG. 5 is a cross-sectional view through the chassis and cover taken along line 5—5 of FIG. 4.

As shown in FIGS. 3–5 for the illustrative lance strip 32a, each of the lance strips 32a, 32b, 32c has an elongated rectangular configuration, is punched inwardly from its associated portion of the alignment frame structure 30 over a punch opening 36 therein, and has a width W, a length L, and a longitudinally intermediate portion 38 rearwardly offset from the frame structure 30 and connected thereto by opposite end sections 40 of the lance strip that project outwardly from the frame structure 30 in a rearward direction. Preferably, the lance strips 32a, 32b, 32c are longitudinally curved along their lengths as best illustrated in FIGS. 3 and 5.

As shown in FIGS. 4 and 5 for the illustrative opening 34a, each of the alignment openings 34a, 34b, 34c has an elongated, generally diamond-shaped configuration with a length $L_1$ greater than the lance strip length L. Additionally, each alignment opening has tapered opposite side portions, with the width $W_1$ of the opening at a longitudinally central portion thereof being substantially greater than the lance strip width W, and the width $W_2$ at the opposite ends of the opening being somewhat smaller than the lance strip width W.

During installation of the cover structure 12, as it slides rearwardly along the chassis 10 and approaches its installed position, the longitudinally intermediate portions 38 of the lance strips 32a, 32a, 32c respectively enter the chassis wall openings 34a, 34b, 34c which, as described above, are wider and longer than the intermediate strip portions 38. As the cover structure front end wall 28 initially approaches the front chassis end wall 14, the longitudinally intermediate lance strip portions 38 freely enter the associated alignment openings 34 which, as previously described, are wider and longer than the strip portions 38. Next, as the longitudinally intermediate strip portions 38 move further through the alignment openings 34, the openings 34 "close in" on the lance strips in a manner such that the lance strip end portions 40 are engaged by opposite side portions of the openings 34 (as best illustrated in FIG. 4), thereby causing the cover end wall 28 to shift as necessary relative to the chassis wall 14 to automatically bring the walls 28, 14 into precise alignment with one another.

Compared to the conventional use of bent flanges disposed on the chassis 10 and receivable in corresponding slots in the cover structure 12, the use of the lance strips 32 and their associated, generally diamond shaped openings 34 provides several advantages. For example, the lance strips are stronger in shear than bent flanges, and accordingly permit more reliable lifting force transfer from the cover wall 28 to the chassis wall 14. Moreover, the lance strips advantageously provide substantially greater resistance to bending than bent flanges. Accordingly, the lance strips are considerably sturdier than bent flanges and are much less likely to be bent out of an alignable relationship with the chassis openings 34. Additionally, the lance strips 32 are more economical to fabricate than bent flanges, requiring only one stroke of a die press as opposed to the two strokes required to form a bent alignment flange.

The lance/opening alignment apparatus of the present invention may be easily and economically formed and incorporated in the illustrated computer apparatus, as well of computer structures of other types, and substantially improves the alignment reliability of the cover/chassis portion of the computer apparatus. As will be readily appreciated by those of skill in the computer fabrication art, while the lances 32 and the openings 34 have been illustrated above as being respectively formed in the cover and chassis walls 28 and 14, they could alternately be formed in the chassis and cover walls 14 and 28, respectively.

The foregoing detailed description is to be clearly understood as being given by way of illustration and example only, the spirit and scope of the present invention being limited solely by the appended claims.

What is claimed is:

1. Computer apparatus comprising:

a first computer structure having a first generally planar wall portion;

a second computer structure having a second generally planar wall portion disposed in a closely adjacent, parallel, facing relationship with said first wall portion; and cooperatively interengaged means, formed on said first and second wall portions, for maintaining said first and second wall portions in precise alignment with one another in two perpendicular directions parallel to said first and second wall portions, said cooperatively interengaged means including:

a spaced plurality of openings formed in said first wall portion, and a spaced plurality of lance strips formed on said second wall portion and laterally projecting outwardly therefrom, said lance strips being removably received in said openings and engaged by peripheral portions thereof in a manner precluding appreciable movement of said lance strips, and thus said second wall portion, parallel to said first wall portion, each of said openings having:

an elongated, generally diamond shaped configuration, a length greater than the length of the lance strip removably received therein, a width at a longitudinally intermediate portion of the opening greater than the width of the lance strip removably received therein, and widths at opposite end portions of the opening less than the width of the lance strip received in the opening.

2. The computer apparatus of claim 1 wherein one of said first and second computer structures is a chassis, and the other of said first and second computer structures is a cover removably positionable over said chassis.

3. The computer apparatus of claim 2 wherein said chassis and cover are portions of a computer tower unit.

4. The computer apparatus of claim 3 wherein said chassis and cover are each formed from a sheet metal material.

5. The computer apparatus of claim 1 wherein:

opposite end portions of each of said lance strips are engaged by facing, oppositely sloped side edge portions of opposite end portions of the opening in which the lance strip is removably received.

6. The computer apparatus of claim 1 wherein:

each of said spaced plurality of lance strips is longitudinally curved along its length.

7. A computer comprising:

a chassis having a generally planar first wall portion;

a cover structure having a second generally planar wall portion, said cover structure being slidable onto said chassis, toward an installed orientation of said cover structure, in a manner moving said second wall portion, along an axis perpendicular thereto, into a closely adjacent, facing, parallel relationship with said first wall portion; and cooperatively interengageable means on said first and second wall portions for creating and maintaining a predetermined, precisely aligned relationship between said first and second wall portions in response to movement of said cover structure to said installed orientation thereof, said cooperatively interengageable means including:

a spaced plurality of openings formed in one of said first and second wall portions; and a spaced plurality of laterally outwardly projecting lance strips formed on the other of said first and second wall portions and configured to enter and be closely and removably received in said openings in response to movement of said cover structure to said installed orientation thereof, each of said openings having:

an elongated, generally diamond shaped configuration, a length greater than the length of the lance strip removably receivable therein, a width at a longitudinally intermediate portion of the opening greater than the width of the lance strip removably receivable therein, and widths at opposite end portions of the opening less than the width of the lance strip removably receivable therein, opposite end portions of each of said lance strips being engageable by facing, oppositely sloped side edge portions of opposite end portions of the opening in which the lance strip is removably receivable.

8. The computer of claim 7 wherein said computer is a computer tower unit.

9. The computer of claim 7 wherein:

said chassis and said cover structure are each formed from a sheet metal material.

10. The computer of claim 7 wherein:

said openings are formed in said first wall portion, and said lance strips are formed in said second wall portion.

11. The computer of claim 7 wherein:

each of said spaced plurality of lance strips is longitudinally curved along its length.

* * * * *